United States Patent
Seo et al.

(10) Patent No.: US 10,182,388 B2
(45) Date of Patent: Jan. 15, 2019

(54) METHOD FOR DETECTING DISCOVERY SIGNAL FOR DEVICE-TO-DEVICE COMMUNICATION IN WIRELESS COMMUNICATION SYSTEM, AND DEVICE FOR SAME

(71) Applicant: LG ELECTRONICS INC., Seoul (KR)

(72) Inventors: Hanbyul Seo, Seoul (KR); Byounghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/913,929

(22) PCT Filed: Oct. 14, 2014

(86) PCT No.: PCT/KR2014/009620
§ 371 (c)(1),
(2) Date: Feb. 23, 2016

(87) PCT Pub. No.: WO2015/056948
PCT Pub. Date: Apr. 23, 2015

(65) Prior Publication Data
US 2016/0205612 A1    Jul. 14, 2016

Related U.S. Application Data

(60) Provisional application No. 61/893,273, filed on Oct. 20, 2013.

(51) Int. Cl.
*H04W 40/24*    (2009.01)
*H04L 1/18*    (2006.01)
(Continued)

(52) U.S. Cl.
CPC .......... *H04W 40/246* (2013.01); *H04L 1/004* (2013.01); *H04L 1/1812* (2013.01);
(Continued)

(58) Field of Classification Search
CPC .......... H04W 40/246; H04W 72/1215; H04W 72/1284
See application file for complete search history.

(56) References Cited

U.S. PATENT DOCUMENTS

2011/0268101 A1    11/2011    Wang et al.
2014/0003262 A1*    1/2014    He ........................ H04W 28/08
                                                                                  370/252
(Continued)

FOREIGN PATENT DOCUMENTS

CN    101371512 A    2/2009
CN    102369740 A    3/2012
(Continued)

OTHER PUBLICATIONS

Institute for Information Industry (III), "SRS Resource Reused for D2D Discovery," 3GPP TSG RAN WG1 Meeting #74bis, R1-134287, Guangzhou, China, Oct. 7-11, 2013, 4 pgs.
(Continued)

*Primary Examiner* — Robert M Morlan
*Assistant Examiner* — Pamit Kaur
(74) *Attorney, Agent, or Firm* — Birch, Stewart, Kolasch & Birch, LLP (57) ABSTRACT

Disclosed is a method by which a terminal detects a discovery signal for device-to-device communication in a wireless communication system. Particularly, the method comprises the steps of: forming a discovery signal group, comprising the pre-set number of code words, on the basis of a discovery signal of a terminal of another user that is already known; receiving and decoding the predetermined
(Continued)

discovery signal; and determining that the discovery signal of the other user's terminal is detected when the decoded discovery signal is included in the discovery signal group.

10 Claims, 9 Drawing Sheets

(51) Int. Cl.
*H04L 5/00* (2006.01)
*H04W 72/12* (2009.01)
*H04L 1/00* (2006.01)
*H04W 88/06* (2009.01)
*H04W 88/08* (2009.01)
*H04W 88/16* (2009.01)

(52) U.S. Cl.
CPC ....... *H04L 5/0055* (2013.01); *H04W 72/1215* (2013.01); *H04W 72/1284* (2013.01); *H04W 72/1289* (2013.01); *H04W 88/06* (2013.01); *H04W 88/08* (2013.01); *H04W 88/16* (2013.01)

(56) References Cited

U.S. PATENT DOCUMENTS

2014/0194062 A1* 7/2014 Palin ................. H04W 4/008
455/41.2

2016/0105791 A1* 4/2016 Wang ................. H04W 8/005
370/335

FOREIGN PATENT DOCUMENTS

| CN | 102369767 A | 3/2012 |
| CN | 102859925 A | 1/2013 |
| EP | 2015606 A1 | 1/2009 |
| JP | 2004-527158 A | 9/2004 |
| JP | 2011-526472 A | 10/2011 |
| KR | 10-2013-0028106 A | 3/2013 |
| WO | WO 2009/158643 A1 | 12/2009 |
| WO | WO 2010/099226 A1 | 9/2010 |

OTHER PUBLICATIONS

Intel Corporation, "Link-level Analysis of LTE-based D2D Discovery Design," 3GPP TSG RAN WG1 Meeting #74, R1-132943, Barcelona, Spain, Aug. 19-23, 2013, pp. 1-8.
LG Electronics, "Resource Allocation and UE Behavior for Discovery Type 1 and Type 2," 3GPP TSG RAN WG1 Meeting #74, R1-133388, Barcelona, Spain, Aug. 19-23, 2013, pp. 1-6.
QUALCOMM Incorporated, "D2D discovery design with simulation results," 3GPP TSG-RAN WG1 #74bis, R1-134627, Guangzhou, China, Oct. 7-11, 2013, pp. 1-15.

* cited by examiner

(a) CONTROL-PLANE PROTOCOL STACK (b) USER-PLANE PROTOCOL STACK

METHOD FOR DETECTING DISCOVERY SIGNAL FOR DEVICE-TO-DEVICE COMMUNICATION IN WIRELESS COMMUNICATION SYSTEM, AND DEVICE FOR SAME

CROSS REFERENCE TO RELATED APPLICATIONS

This application is the National Phase of PCT International Application No. PCT/KR2014/009620, filed on Oct. 14, 2014, which claims priority under 35 U.S.C. 119(e) to U.S. Provisional Application No. 61/893,273 filed on Oct. 20, 2013, all of which are hereby expressly incorporated by reference into the present application.

TECHNICAL FIELD

The present invention relates to a wireless communication system and, more particularly, to a method and apparatus for detecting a discovery signal for device-to-device communication in a wireless communication system.

BACKGROUND ART

3GPP LTE (3rd generation partnership project long term evolution hereinafter abbreviated LTE) communication system is schematically explained as an example of a wireless communication system to which the present invention is applicable.

Figure 1:
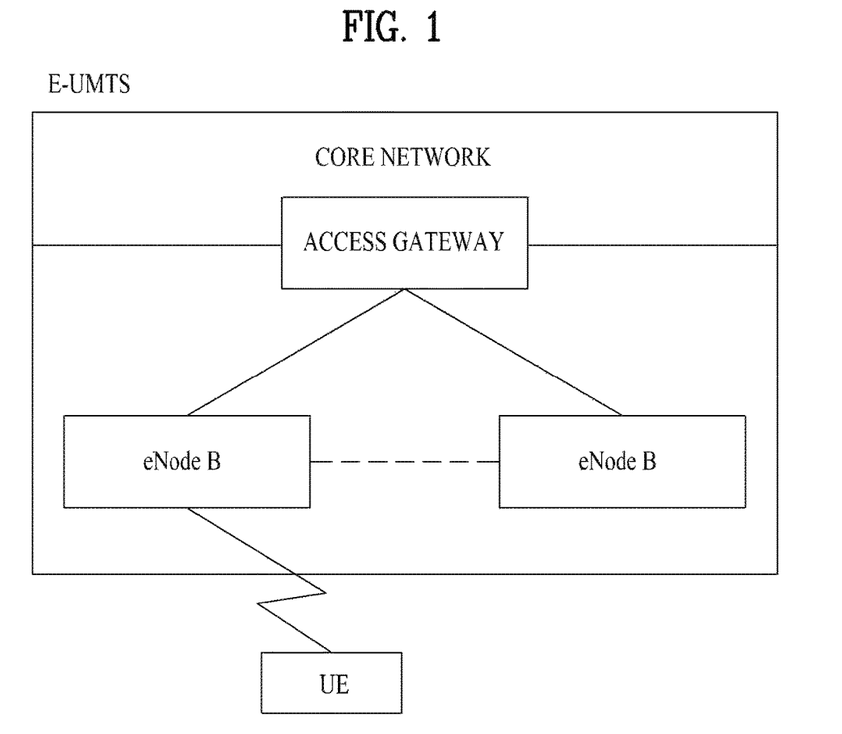
FIG. 1 is a diagram showing a network structure of an Evolved Universal Mobile Telecommunications System (E-UMTS) as an example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method and apparatus for detecting a discovery signal for device-to-device communication in a wireless communication system.

Technical Solution

The object of the present invention can be achieved by providing a method for, at a user equipment (UE), detecting a discovery signal for device-to-device communication in a wireless communication system including configuring a discovery signal group including a predetermined number of codewords based on a known discovery signal of a counterpart UE, receiving and decoding a predetermined discovery signal, and determining that the discovery signal of the counterpart UE is detected, when the decoded discovery signal belongs to the discovery signal group.

The determining that the discovery signal of the counterpart UE is detected may include performing error checking of the predetermined discovery signal and determining one of a first detection state and a second detection state based on error checking. In this case, the determining of one of the first detection state and the second detection state may include determining the first detection state when the decoded discovery signal belongs to the discovery signal group and error checking is successful and determining the second detection state when the decoded discovery signal belongs to the discovery signal group and error checking fails. The method may further include delivering information on a detection state to a higher layer, and the information on the detection state may include both the first detection state and the second detection state or only the first detection state according to a configuration of the higher layer.

The configuring of the discovery signal group may include configuring the discovery signal group based on information bits of the known discovery signal of the counterpart UE.

In another aspect of the present invention, provided herein is a user equipment (UE) apparatus for performing device-to-device communication in a wireless communication system including a wireless communication module configured to transmit and receive a signal to and from a base station or a counterpart UE apparatus of device-to-device communication and a processor configured to process the signal. The processor configures a discovery signal group including a predetermined number of codewords based on a known discovery signal of a counterpart UE, receives and decodes a predetermined discovery signal and determines that the discovery signal of the counterpart UE is detected when the decoded discovery signal belongs to the discovery signal group.

The processor may perform error checking of the predetermined discovery signal and determine one of a first detection state and a second detection state based on error checking. In this case, the processor may determine the first detection state when the decoded discovery signal belongs to the discovery signal group and error checking is successful and determine the second detection state when the decoded discovery signal belongs to the discovery signal group and error checking fails. In particular, the processor may deliver information on a detection state to a higher layer and the information on the detection state may include both the first detection state and the second detection state or only the first detection state according to a configuration of the higher layer.

Advantageous Effects

According to the embodiments of the present invention, it is possible to more efficiently detect a discovery signal for device-to-device communication in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 2:
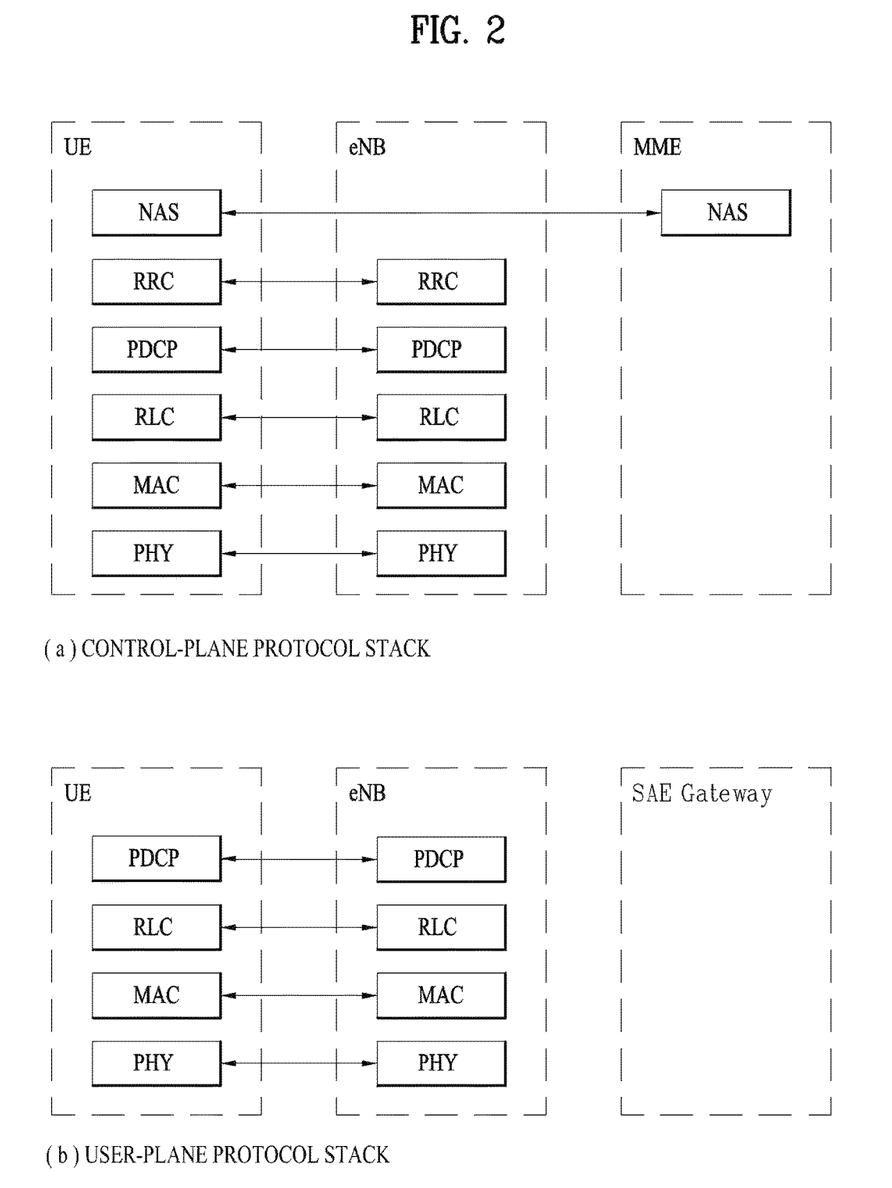
FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
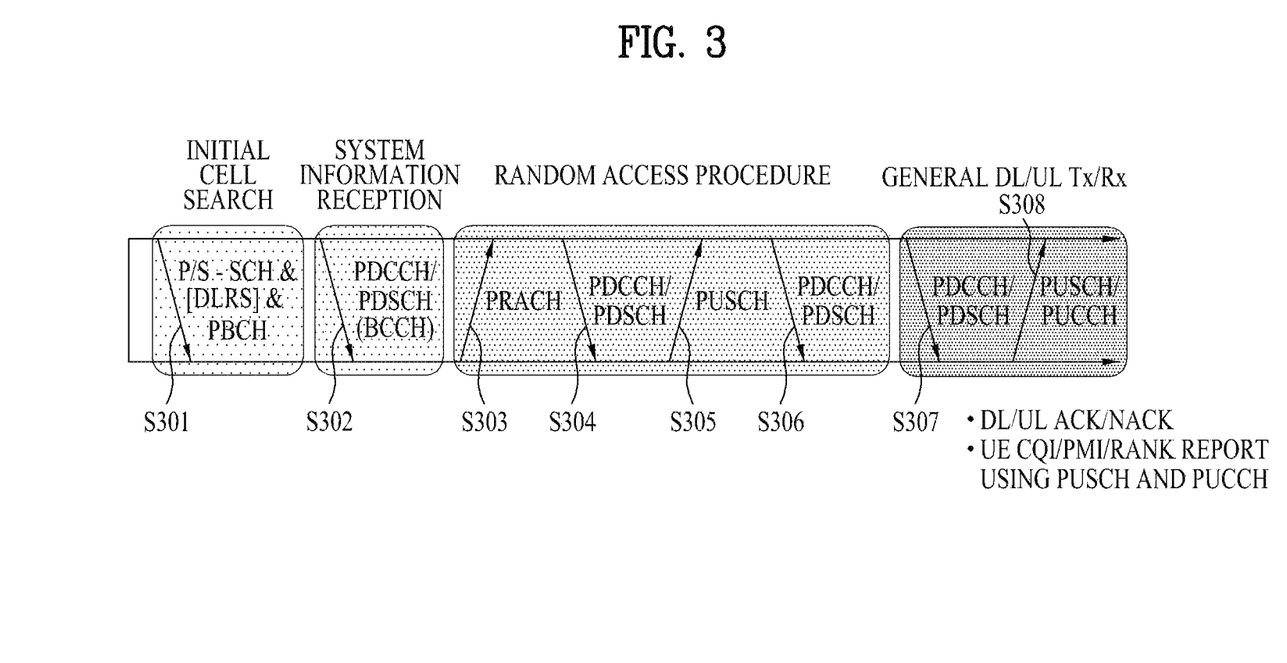
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
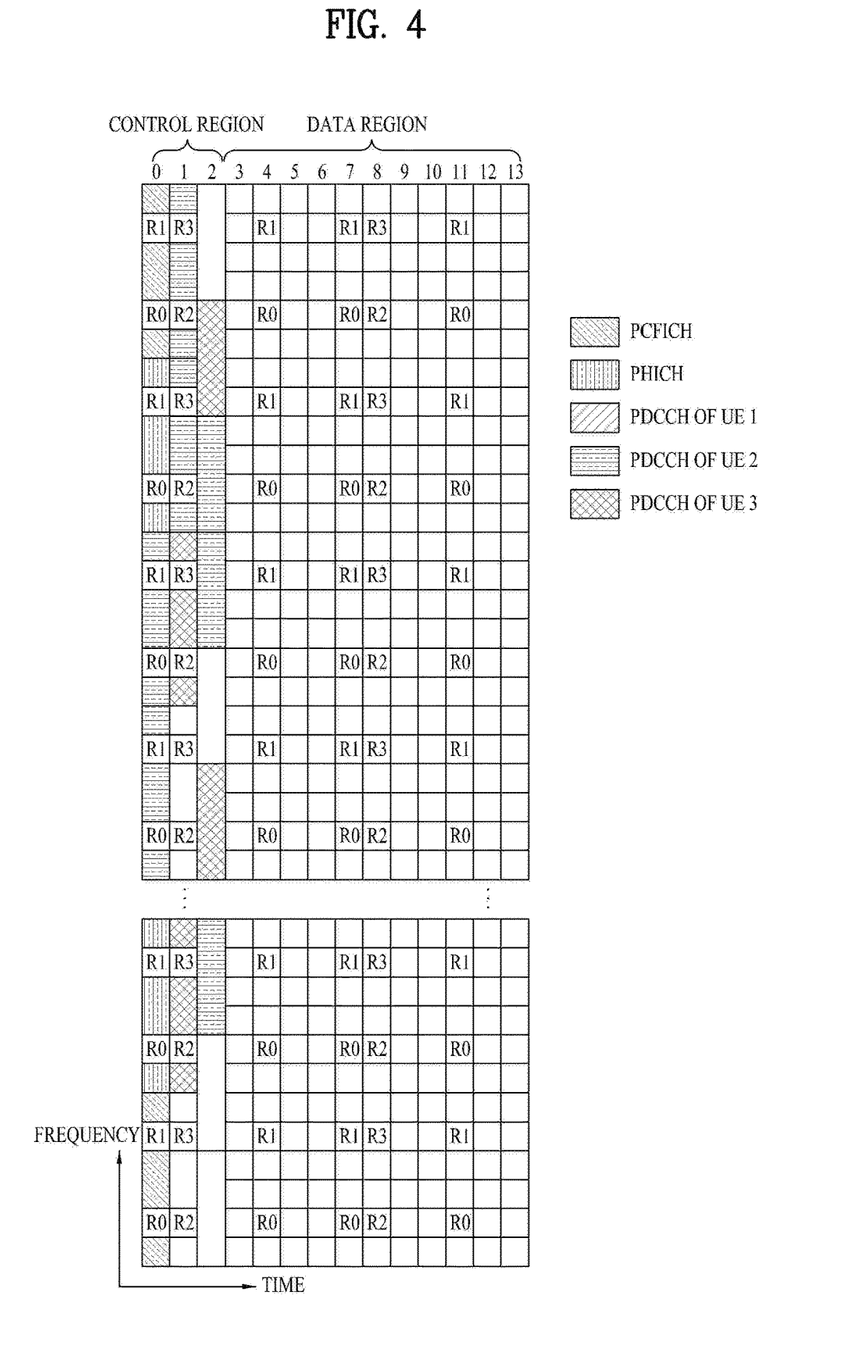
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
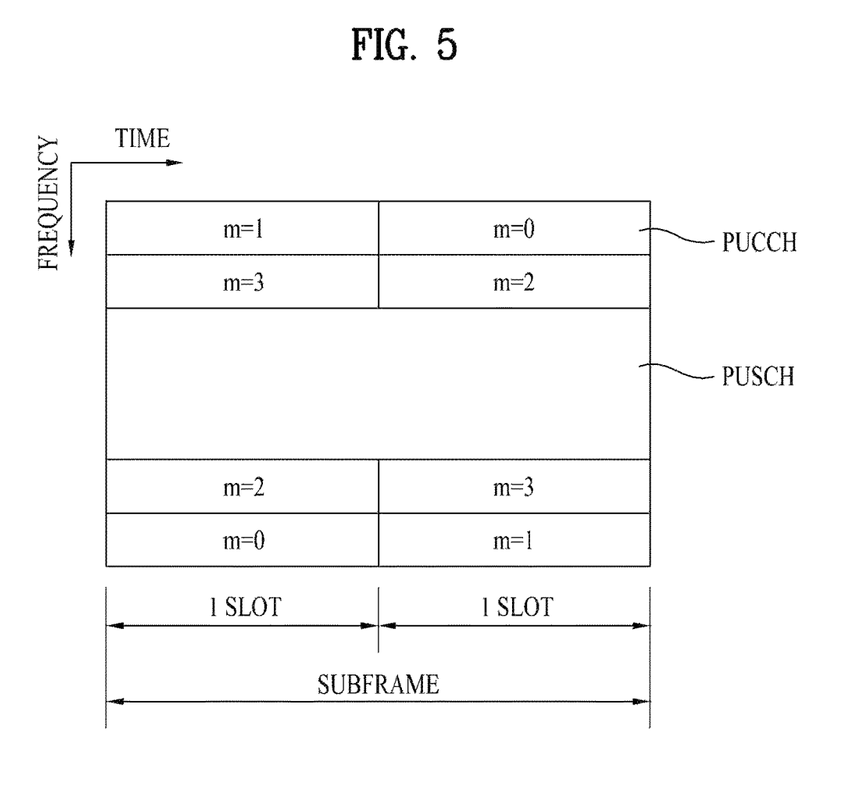
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

A basic resource unit of a DL control channel is an REG. The REG includes four contiguous REs except for REs carrying RSs. A PCFICH and a PHICH include 4 REGs and 3 REGs, respectively. A PDCCH is configured in units of a Control Channel Element (CCE), each CCE including 9 REGs.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
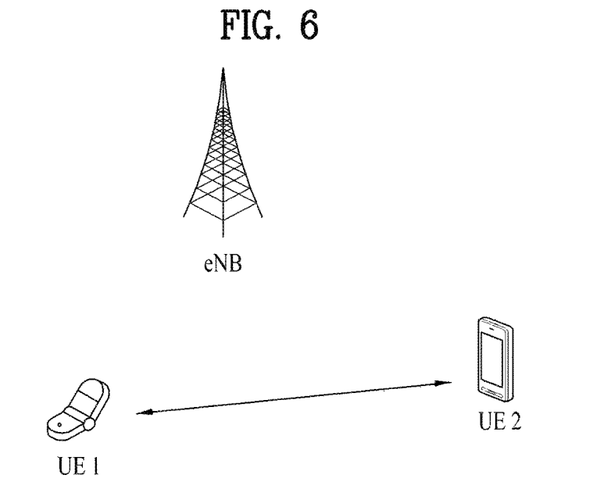
FIG. 6 is a diagram illustrating the concept of device-to-device (D2D) communication.

FIG. 6 is a diagram illustrating the concept of device-to-device (D2D) communication.

Referring to FIG. 6, during D2D communication (i.e., D2D direct communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs. Hereinafter, a link between UEs is referred to as a D2D link and a link for communication between a UE and an eNB is referred to as an NU link.

In order to perform D2D operation, a UE performs a discovery procedure of determining whether a counterpart UE of D2D communication is located in a D2D communication area. Such a discovery procedure includes transmitting a unique discovery signal for identifying each UE and determining that the UE, which has transmitted the discovery signal, is located at a neighboring position when a neighboring UE detects the discovery signal. That is, each UE determines whether a counterpart UE of D2D communication is located at a neighboring position via the discovery procedure and then performs D2D communication for transmitting and receiving user data.

The discovery signal transmitted by UE1 generally includes information for enabling a reception UE to be aware that the signal was transmitted from UE1. For example, the discovery signal may include the device ID or service ID of UE1. At this time, when UE2 knows the discovery signal transmitted by UE1, e.g., the device ID or service ID used by UE1, it is possible to further increase a probability that detection of the discovery signal of UE1 is successful using the information.

More specifically, when UE2 receives the discovery signal using a specific resource, if it is assumed that an arbitrary discovery signal is transmitted using the corresponding resource, all information bits of the discovery signal are regarded as unknown bits, the discovery signal is decoded and information on a transmission UE is extracted therefrom. Accordingly, a final result of a discovery reception circuit of UE2 becomes an indicator indicating which of 2A pieces of transmission UE information is used upon transmitting an A-bit discovery signal. In contrast, when UE2 receives the discovery signal using a specific resource, if it is assumed that the discovery signal of a specific UE (UE1 of FIG. 6) is transmitted using the corresponding resource, all information bits of the discovery signal are regarded as known bits and whether the discovery signal was transmitted is only determined.

Accordingly, the final result of the reception circuit becomes a 1-bit indicator indicating whether the discovery signal of the transmission UE was transmitted even upon transmitting the A-bit discovery signal. Due to the effect that the number of bits of the final result of the reception circuit decreases, the latter method should be used in order to increase the probability that the discovery signal is successfully detected.

As a method for pre-recognizing and detecting the discovery signal of the transmission UE at the reception UE, the following methods are proposed.

Partial discovery signal matching: In this method, the discovery signal is decoded and, although bits output as the decoded result do not completely match the discovery signal to be detected, when less than a predetermined number of bit errors occurs, the discovery signal is assumed to be detected. For example, upon decoding the discovery signal, a difference with the discovery signal to be detected of which is B bits or less, the discovery signal to be detected is regarded as being found. This method does not consider power of the received discovery signal and thus, although no signal is actually transmitted, it may be erroneously determined that the discovery signal to be detected is detected based on a low level of noise.

Discovery signal correlation: In this method, the discovery signal assumed by the reception UE is regarded as one known sequence and detection operation for correlating a received signal with the sequence is performed. Accordingly, it is possible to detect the receive power of the assumed discovery signal using the result of correlation. When this power is equal to or greater than a predetermined level, transmission of the discovery signal is assumed. In this method, since separate correlation operation is performed along with decoding of the discovery signal when the reception UE should simultaneously detect the discovery signals which are not pre-recognized, the UE is complicatedly implemented when the number of UEs, the signals of which will be detected, increases.

Hereinafter, a method for solving the above-described problem upon pre-recognizing and using the discovery signal of the transmission UE will be described.

Figure 7:
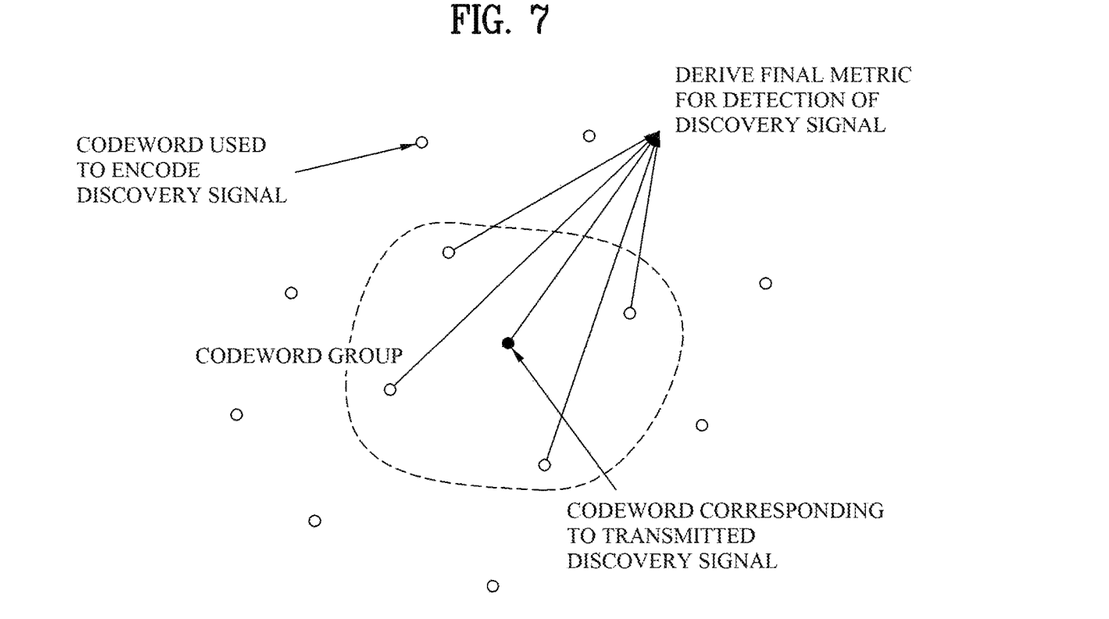
FIG. 7 is a diagram showing the concept of a method for detecting a discovery signal according to an embodiment of the present invention.

FIG. 7 is a diagram showing the concept of a method for detecting a discovery signal according to an embodiment of the present invention.

In the method for detecting the discovery signal of the present invention, a reception UE first decodes a discovery signal although the discovery signal of a transmission UE is pre-recognized. In general, a metric (e.g., likelihood, probability, correlation, etc.) of each codeword which may be transmitted as a discovery signal may be calculated before a final result of decoding the discovery signal and a codeword having a maximum metric is selected in general decoding. In the present invention, the metric of the decoding process is used.

More specifically, codewords located near a codeword corresponding to the discovery signal of the transmission UE pre-recognized by the reception UE are formed as one virtual codeword group as shown in FIG. 7 and whether the discovery signal of the transmission UE was transmitted via the metric of the codewords belonging to the codeword group is determined.

Here, a function for calculating a final metric from the metric of G codewords belonging to the codeword group is necessary and is indicated by $f(m_1, m_2, \ldots, m_G)$. Here, $m_i$ corresponds to the metric of an i-th codeword of the codeword group. Examples of such a function are as follows. When the calculated final metric exceeds a predetermined criterion, the discovery signal of the UE is regarded as being transmitted.

$f(m_1, m_2, \ldots, m_G) = \max\{m_1, m_2, \ldots, m_G\}$ (a maximum metric is selected as a representative metric)   1)

$f(m_1, m_2, \ldots, m_G) = (m_1 + m_2 + \ldots + m_G)/G$ (an average metric is selected as a representative metric)   2)

$f(m_1, m_2, \ldots, m_G) = (a_1 m_1 + a_2 m_2 + \ldots + a_G m_G)$ (a linear combination of metrics is selected as a representative metric)   3)

In particular, in 3), a weighting factor $a_i$ may be determined by a distance with the codeword of the transmission UE. As the distance increases, the weighting factor decreases.

In particular, as the codeword adjacent to the discovery signal of the transmission UE, some of the codewords belonging to the codeword group may have a large difference with the discovery signal of the transmission UE in the final discovery signal bits according to encoding methods. This is because a difference of a small number of information bits does not cause a difference of a small number of encoded bits in an arbitrary channel coding method. For example, in the information bits, although a difference between two codewords is one bit, a difference of a large number of bits may occur on a codeword after channel coding such as turbo coding. This may be regarded as being differentiated from partial discovery signal matching method for determining the number of errors in the information bits after final decoding.

Hereinafter, the case of using a convolutional code based Viterbi decoding algorithm will be described.

Figure 8:
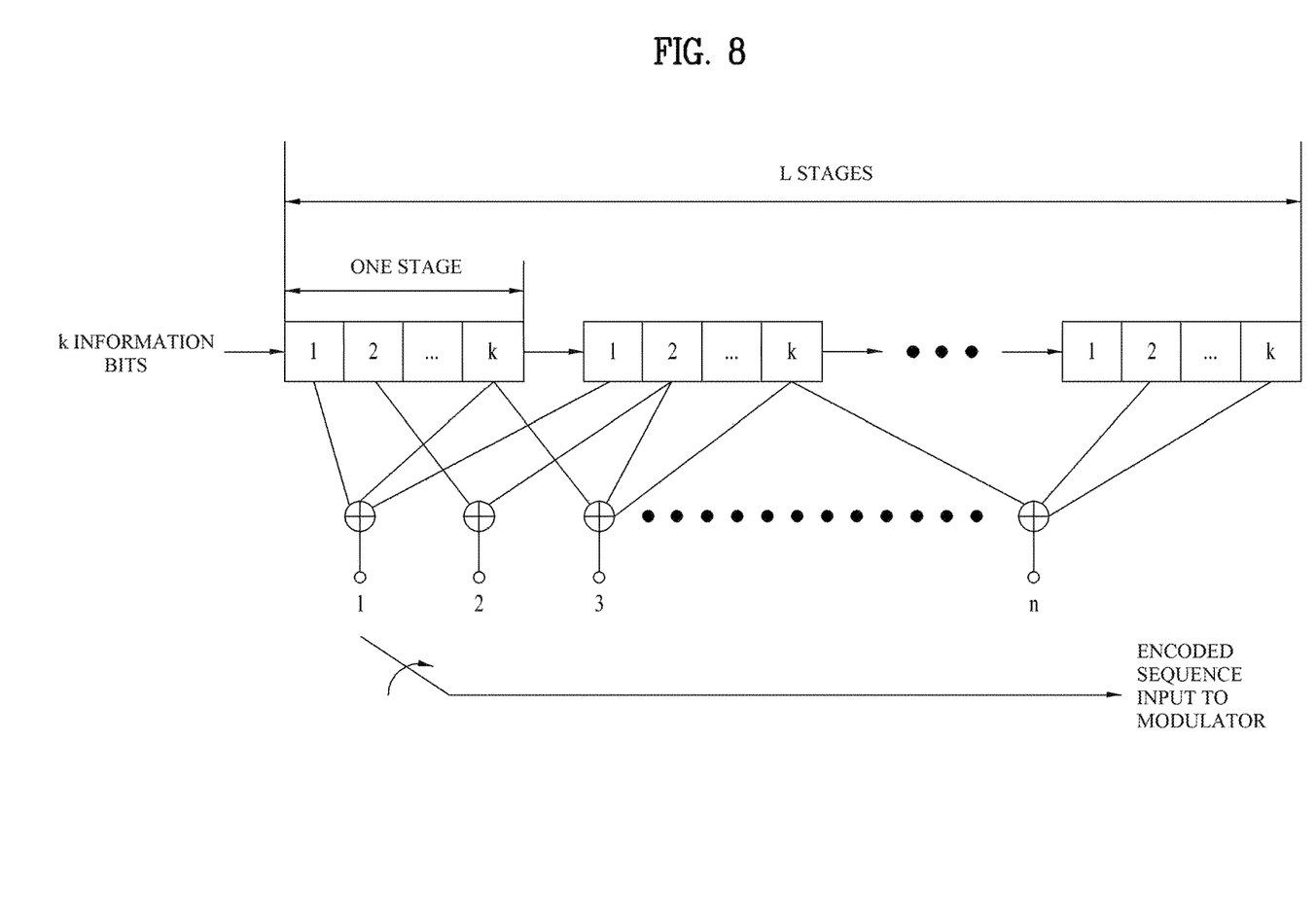
FIG. 8 is a diagram showing a convolutional code based Viterbi decoding algorithm.

FIG. 8 is a diagram showing a convolutional code based Viterbi decoding algorithm. In particular, in FIG. 8, the number of stages of a register is L, the number of bits input to each register is k and the number of encoded bits output when k bits are input is n. Accordingly, the coding rate of FIG. 8 is k/n.

Referring to FIG. 8, when k information bits are input, bits located at the stages are shifted by one stage and n encoded bits are output via a logical sum process. At this time, which bits are located at L stages is referred to as a state of a convolutional code. That is, if k information bits are input when the convolution code is in a specific state, specific n encoded bits are output to change the state. The Viterbi decoding algorithm performs optimal decoding while tracking state change.

More specifically, when the total number of states appearing via L stages is P and state candidates are $S_1, S_2, \ldots, S_p$, the decoder calculates the metric of a state candidate i as $S_i(m)$ in a state of receiving m*k information bits. Thereafter, in a state of receiving the subsequent k information bits, the metric of each state candidate is updated to $S_i(m+1)$ via the following process.

1) A result of correlating the received signal with a combination of arbitrary n bits is calculated.

2) When the state of the convolution encoder is x at a time x, if a combination of specific n bits applied to the correlation changes the state to y at a time m+1, $S_y(m+1)$ appears as a sum of $S_x(m)$ and the correlation.

3) When two or more paths converging on the same state are present at a time m+1, the largest value of the updated metrics is regarded as being valid. A state transition path having a largest value may be selected as a survived path.

Through the above-described process, the decoder may apply the principle of the present invention since an optimal state transition path in which a sum of correlation with the encoded bits is maximized from a first state to each state at a specific time and a correlation value of each path are confirmed. That is, when transmission of the encoded bits is completely finished, the metric of each state becomes the metric of a codeword corresponding to the survived transition path having a corresponding state as a last state. Here, the metric indicates a result of correlating the codeword and the received signal. Accordingly, a metric corresponding to a codeword belonging to the codeword group is found from the metrics of the final state to calculate a final metric and then whether the discovery signal of the transmission UE is detected may be determined.

Figure 9:
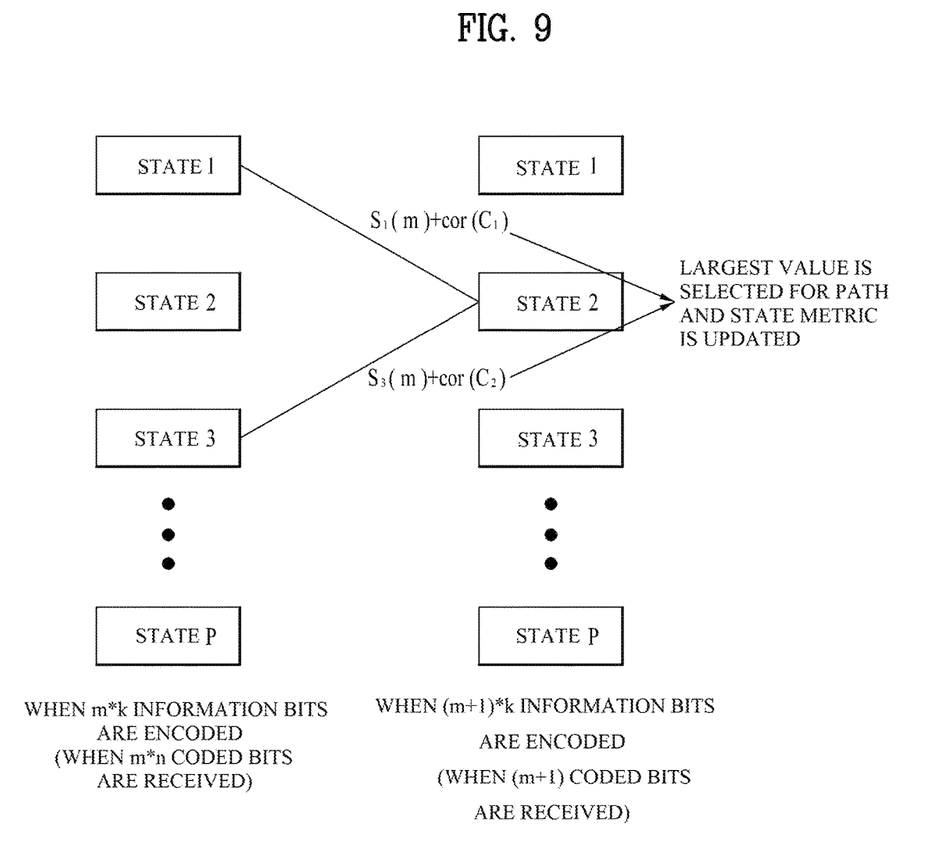
FIG. 9 is a diagram showing an example of a method for detecting a discovery signal according to an embodiment of the present invention.

FIG. 9 is a diagram showing an example of a method for detecting a discovery signal according to an embodiment of the present invention. In FIG. 9, for convenience of description, only paths in which state 1 and state 3 transition to state 2 are shown. In this case, n-bit combinations $C_1$ and $C_2$ cause state 1 and state 3 to transition to state 2. In addition, $Cor(C_i)$ means correlation between the received signal and an n-bit combination $C_x$.

As a modification of the above-described Viterbi decoding algorithm, when one of a plurality of paths merged into a specific state at a specific time is taken, priority is assigned to a path corresponding to a codeword belonging to a codeword group, such that the number of codewords belonging to the codeword group is greater than the number of codewords which do not belong to the codeword group, upon calculating the final metric.

For example, the number of transitions to y at a time m+1 is two: one transition starts at state x1 to generate n-bit coded bit combination 1 and another transition starts at state x2 to generate n-bit coded bit combination 2. Although the former metric (a sum of the metric at state x1 and correlation of n-bit coded bit combination 1) is greater than the latter metric (a sum of the metric at state x2 and correlation of n-bit coded bit combination 2), when a codeword causing the former transition is not present in the codeword group but a codeword causing the latter transition is present in the codeword group, the state y at the time m+1 is regarded as being derived from the latter combination to update the metric and state transition.

Referring to FIG. 9, although transition from state 1 has a metric higher than that of transition from state 3 in an existing Viterbi decoding algorithm, the transition path appearing from transition from state 1 does not appear in the codeword group, transition from state 3 is selected. In other words, when a codeword causing a specific transition path is not present in the codeword group, the metric of the corresponding path may be regarded as always being a minimum value.

The reception UE may be implemented upon determining that the signal of the transmission UE is detected. For example, the case in which a codeword having a maximum metric matches the discovery signal of the transmission UE (hereinafter, referred to as detection case 1) and the case in which a codeword having a maximum metric does not match the discovery signal of the transmission UE but it is determined that the discovery signal of the transmission UE is detected according to a final metric derived from the codeword group (hereinafter, referred to as detection case 2) may be distinguished. In this case, the UE may distinguishably report the two cases to an application layer for processing the discovery signal. In addition, the application layer, which has received the two cases, may determine detections cases 1 and 2 as UE detection according to discovery reliability if a detection error problem is restricted or may determine only detection case 1 as UE detection if only safer detection is required.

The two detection cases may be divided into high-reliability discovery signal detection and low-reliability discovery signal or may be divided into discovery signal detection passing through CRC (that is, detection case 1) and discovery signal detection without passing through CRC (that is, detection case 2) if CRC is attached to the discovery signal.

Figure 10:
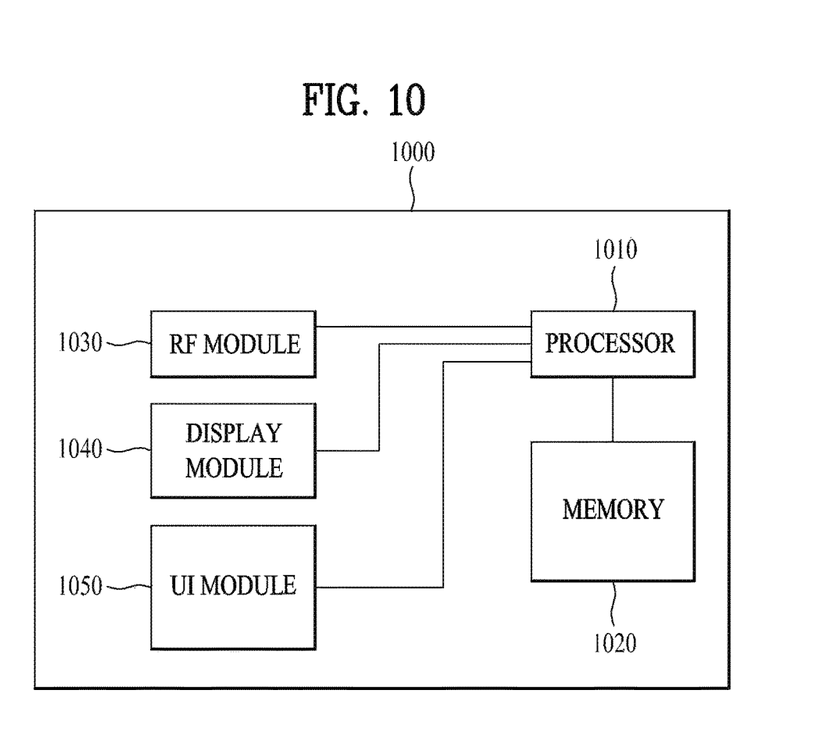
FIG. 10 is a block diagram of a communication apparatus according to an embodiment of the present invention.

FIG. 10 is a block diagram illustrating a communication device according to embodiments of the present invention.

In FIG. 10, the communication device 1000 includes a processor 1010, a memory 1020, a Radio Frequency (RF) module 1030, a display module 1040, and a user interface (UI) module 1050.

The communication device 1000 is disclosed for illustrative purposes only and certain modules may also be omitted from the communication device 1000 as necessary. In addition, the communication device 1000 may further include necessary modules. Some modules of the communication device 1000 may be identified as more detailed modules. The processor 1010 is configured to carry out the operations of the embodiments of the present invention. For detailed operations of the processor 1010 reference may be made to FIGS. 1 to 9.

The memory 1020 is connected to the processor 1010, and stores an operating system, applications, program code, data and the like. The RF module 1030 is connected to the processor 1010 and converts a baseband signal into a radio frequency (RF) signal, or converts the RF signal into the baseband signal. For these operations, the RF module 1030 performs analog conversion, amplification, filtering, and frequency up-conversion in order or performs such operations in reverse order. The display module 1040 is connected to the processor 1010 and displays a variety of information. The scope or spirit of the display module 1040 of the present invention is not limited thereto, and the display module 1040 may be any of well-known elements, for example, a Liquid Crystal Display (LCD), a Light Emitting Diode (LED), an Organic Light Emitting Diode (OLED) and the like. The user interface (UI) module 1050 is connected to the processor 1010, and may be implemented as a combination of user interfaces such as a keypad, a touchscreen, etc.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

Although an example of applying a method and apparatus for detecting a discovery signal for device-to-device communication in a wireless communication system to a 3GPP LTE system is described, the present invention is applicable to various wireless communication systems in addition to the 3GPP LTE system.

The invention claimed is:

1. A method for, at a user equipment (UE), detecting a discovery signal for device-to-device communication in a wireless communication system, the method comprising:

configuring a discovery signal group including a predetermined number of codewords based on a known discovery signal of a counterpart UE;

determining a representative metric according to a linear combination of values obtained by multiplying each of metrics corresponding to the codewords of the discovery signal group and each of weight factors corresponding to the codewords of the discovery signal group; and determining that the known discovery signal of the counterpart UE is detected, when the representative metric is greater than a predetermined value, wherein the weight factors are determined based on a distance between the UE and each of the codewords of the discovery signal group.

2. The method according to claim 1, wherein the determining that the known discovery signal of the counterpart UE is detected includes:

receiving and decoding a predetermined discovery signal;

performing error checking of the predetermined discovery signal; and determining one of a first detection state and a second detection state based on the error checking.

3. The method according to claim 2, wherein the determining one of the first detection state and the second detection state includes:

determining the first detection state when the decoded predetermined discovery signal belongs to the discovery signal group and the error checking is successful; and determining the second detection state when the decoded predetermined discovery signal belongs to the discovery signal group and the error checking fails.

4. The method according to claim 2, further comprising delivering information on a detection state to a higher layer, wherein the information on the detection state includes both the first detection state and the second detection state or only the first detection state according to a configuration of the higher layer.

5. The method according to claim 1, wherein the configuring of the discovery signal group includes configuring the discovery signal group based on information bits of the known discovery signal of the counterpart UE.

6. A user equipment (UE) for performing device-to-device communication in a wireless communication system, the UE comprising:

a wireless communication module configured to transmit and receive a signal to and from a base station or a counterpart UE of the device-to-device communication; and a processor configured to:
process the signal, configure a discovery signal group including a predetermined number of codewords based on a known discovery signal of the counterpart UE, determine a representative metric according to a linear combination of values obtained by multiplying each of metrics corresponding to the codewords of the discovery signal group and each of weight factors corresponding to the codewords of the discovery signal group, and determine that the known discovery signal of the counterpart UE is detected, when the representative metric is greater than a predetermined value, wherein the weight factors are determined based on a distance between the UE and each of the codewords of the discovery signal group.

7. The UE according to claim 6, wherein the processor is further configured to:

receive and decode a predetermined discovery signal, perform error checking of the predetermined discovery signal, and determine one of a first detection state and a second detection state based on the error checking.

8. The UE according to claim 6, wherein the processor determines the first detection state when the decoded predetermined discovery signal belongs to the discovery signal group and the error checking is successful, and the processor determines the second detection state when the decoded predetermined discovery signal belongs to the discovery signal group and the error checking fails.

9. The UE according to claim 6, wherein the processor delivers information on a detection state to a higher layer, and the information on the detection state includes both the first detection state and the second detection state or only the first detection state according to a configuration of the higher layer.

10. The UE according to claim 6, wherein the discovery signal group is configured based on information bits of the known discovery signal of the counterpart UE.

* * * * *